United States Patent Office.

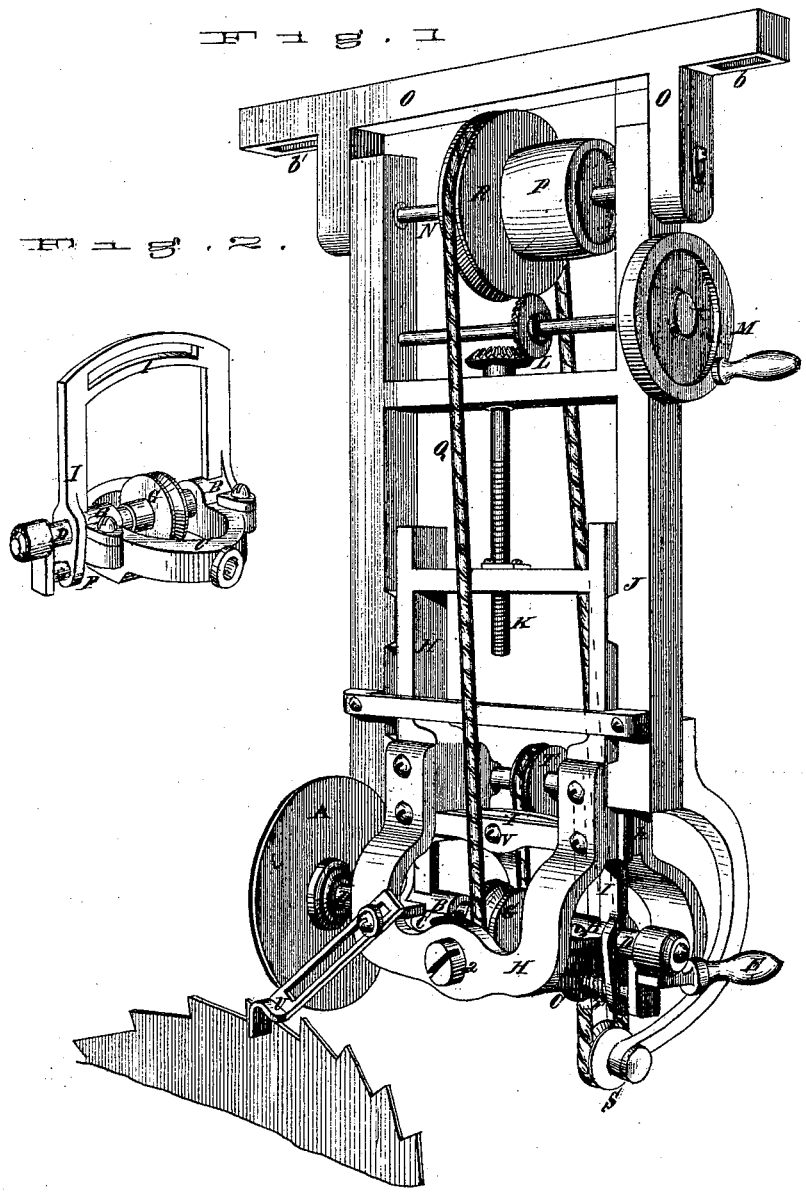

WILLIAM S. SPRATT, OF CINCINNATI, OHIO.

Letters Patent No. 95,391, dated September 28, 1869.

IMPROVEMENT IN APPARATUS FOR SHARPENING AND GUMMING SAWS.

The Schedule referred to in these Letters Patent and making part of the same.

*To all whom it may concern:*

Be it known that I, WILLIAM S. SPRATT, of Cincinnati, Hamilton county, State of Ohio, have invented certain new and useful Improvements in Apparatus for Sharpening and Gumming Saws; and I do hereby declare the following to be a sufficiently full, clear, and exact description thereof, to enable one skilled in the art to which my invention appertains, to make and use it, reference being had to the accompanying drawings, making part of this specification.

My invention relates to that class of apparatus in which rotary emery-wheels, or cutters, are used for "gumming" and "sharpening;" and consists of certain devices, which dispense with the necessity of removing the saw from its arbor, or frame, to be gummed or sharpened, and permit of the adjustment of the revolving wheel, while in operation, to any desired position or angle with relation to the saw-teeth.

In the accompanying drawings—

Figure 1 is a perspective view of an apparatus embodying my invention, exhibiting its application to circular saws.

Figure 2 is a detached view of the frame in which the gumming-wheel is journalled.

The wheel or cutter A is journalled in the bearings B of the swivelling-frame C.

The spindle D has lateral motion, by sliding through the boxes B, this motion being governed by the handle E, (in the hands of the operator,) and the retracting-spring F.

The spindle D is fitted with a grooved pulley, G, by which the wheel is driven.

The frame C is pivoted to the frame H at $a\ a'$, and is provided with an arc, I, slotted, as shown, by which it may be secured in any desired angle.

The frame H is fitted with slides $h$, and traverses vertically the swinging frame J. It is elevated and depressed by means of screw K, bevel-gearing L, and hand-wheel M.

The frame J swings on the shaft N, which is journalled in the frame O.

The frame O is slotted at $b\ b'$, and secured to the joists of the building, or otherwise, so as to be capable of lateral adjustment.

The shaft N is provided with a driving-pulley, P, which communicates with the power, and the wheel A is driven by means of belt Q, which passes, as shown, over pulley R, idler-pulley S on frame J, idler-pulley T on sliding frame H, and from thence over pulley G on the wheel-spindle D.

This arrangement of pulleys, it will readily be seen, admits of the sliding of frame H without changing the length of belt Q.

A gauge, U, is fixed to the frame H, which is slotted and adjustable, in the manner shown. This gauge serves to adjust the position of the saw for each cut, before the wheel is brought to bear upon it.

In the operation of gumming and sharpening, the wheel A is made to swing across the saw, and, by means of the various devices, may be adjusted in the hands of the operator universally, to shape the teeth in any desired form. When one tooth is formed to suit, the frame O is permanently secured by screw V, and the gauge U adjusted. The whole number of teeth will then be formed of uniform depth and shape.

I claim herein as new, and of my invention—

1. The swinging frame J, sliding frame H, and swivelling adjustable frame C, constructed and arranged substantially in the manner and for the purpose described.

2. The combination of the adjustable gauge U with the cutter A, sliding spindle D, and retracting-spring F, substantially as shown and described.

In testimony of which invention, I hereunto set my hand.

WM. S. SPRATT.

Witnesses:
CHAS. E. CALLAHAN,
HENRY MILLWARD.